United States Patent [19]

Cemin

[11] Patent Number: 4,534,780
[45] Date of Patent: Aug. 13, 1985

[54] APPARATUS FOR HEAT TREATMENT OF OBJECTS BY CONVECTION

[75] Inventor: Hans Cemin, Fullingsdorf, Switzerland

[73] Assignee: Societe d'Etudes et Installations Industrielles CNUD S.A., Brussels, Belgium

[21] Appl. No.: 475,549

[22] Filed: Mar. 15, 1983

[30] Foreign Application Priority Data

Mar. 25, 1982 [FR] France .................. 82 05087

[51] Int. Cl.³ ............................................. C03B 25/06
[52] U.S. Cl. ........................................ 65/348; 65/119; 65/351
[58] Field of Search ................. 65/119, 348, 349, 350, 65/351, 162; 432/136, 152, 176, 199, 59, 48, 144, 146

[56] References Cited

U.S. PATENT DOCUMENTS

| | | | |
|---|---|---|---|
| 2,045,259 | 6/1936 | Batchell | 432/145 |
| 2,725,680 | 12/1955 | Baker | 65/350 |
| 2,982,052 | 5/1961 | Lawson | 65/162 |
| 3,778,245 | 12/1973 | Clark et al. | 65/119 |
| 4,012,190 | 3/1977 | Dicks et al. | 432/145 |
| 4,298,341 | 11/1981 | Nowack | 432/64 |

FOREIGN PATENT DOCUMENTS

| | | | |
|---|---|---|---|
| 20221 | 12/1980 | European Pat. Off. | 65/119 |
| 2518007 | 11/1975 | Fed. Rep. of Germany . | |
| 1393921 | 2/1965 | France . | |
| 2197456 | 3/1974 | France . | |
| 2420109 | 10/1979 | France . | |

Primary Examiner—S. Leon Bashore
Assistant Examiner—Michael K. Boyer
Attorney, Agent, or Firm—Christie, Parker & Hale

[57] ABSTRACT

A tunnel furnace composed of modular sections, each modular section comprising horizontal and mutually parallel openings occupying the width of a heat treatment enclosure, the openings being beneath the top of a conveyor and adjacent each other in a direction parallel to the direction of travel of the conveyor with each opening extending perpendicular to the direction of travel, such that each opening gives out a sheet of ascending gas, a collecting slot formed in an upper wall of the heat treatment enclosure extending horizontally, mutually parallel, perpendicular to the direction of travel of the conveyor and extending the width of the enclosure, such that the slot collects the sheet of ascending gas, temperature adjusting devices for maintaining the temperature of the collected gas for the module, a circulating fan for accepting the collected gas and circulating the gas via a gas circulation path to the openings after passing through the temperature adjusting devices and a regulating device for controlling each temperature adjusting device.

21 Claims, 9 Drawing Figures

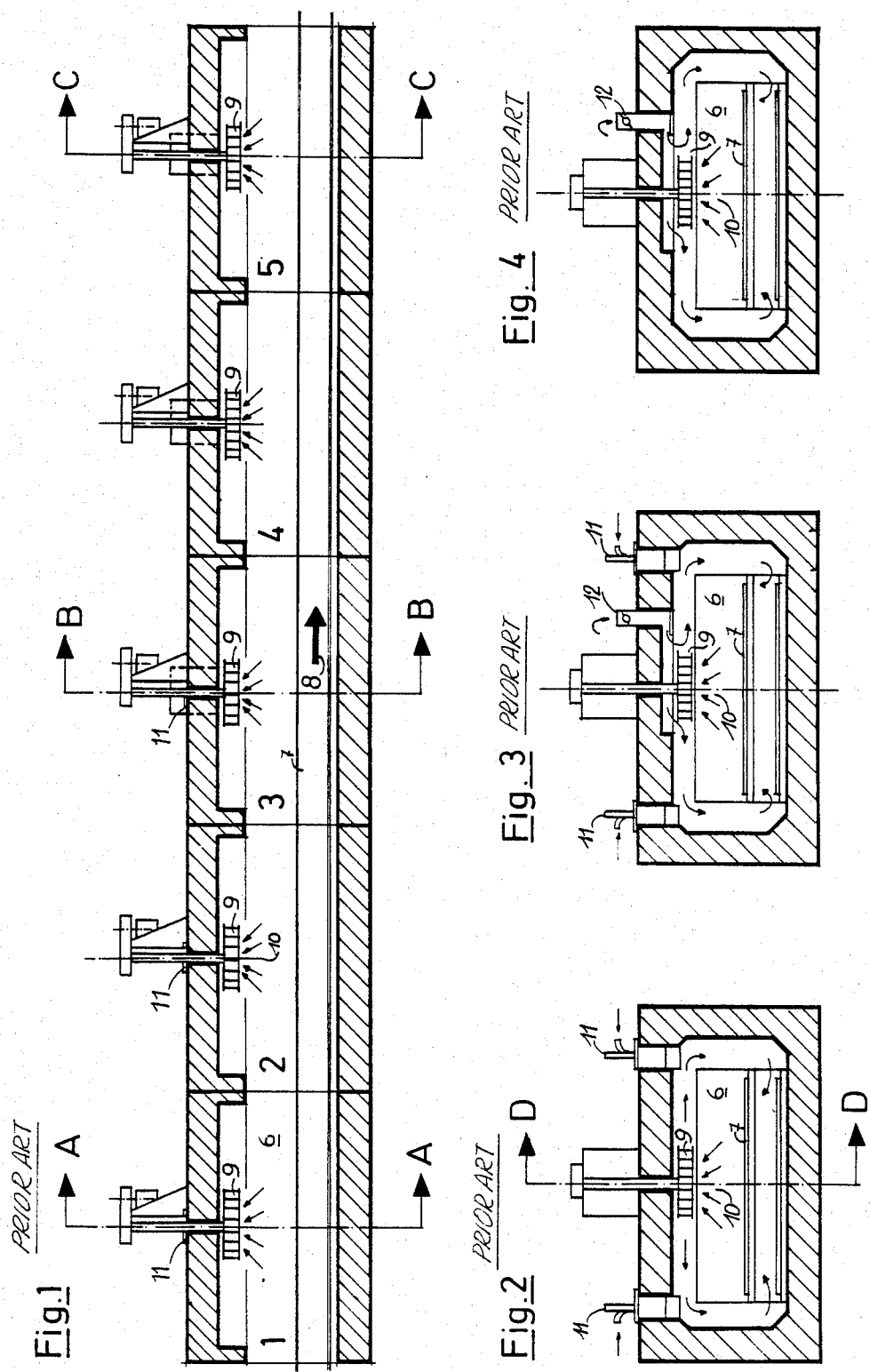

APPARATUS FOR HEAT TREATMENT OF OBJECTS BY CONVECTION

BACKGROUND OF THE INVENTION

The present invention relates to an apparatus for heat treatment, such as a continuous annealing furnace for separate hollow bodies, in particular for hollow glass products such as bottles, pots, wide-mouthed jars, crockery, cathode ray tubes for TV, etc.

Heat treatment, particularly for annealing, of hollow glass products is carried out by heating them to the annealing temperature, then progressively cooling them. Such a treatment is conventionally carried out in a tunnel furnace equipped with a conveyor which causes the objects to be treated to pass through it.

The obviously simplest system for obtaining progressive cooling is to cause air to circulate countercurrent to the bodies to be treated, regulating the flow as a function of the temperature existing at a given location in the furnace. In practice it has been found that even if control is exerted on the entry of the air and on its exit, sufficient thermal homogeneity is not obtained.

Another process consists of causing the glass objects to be treated to pass through a tunnel furnace in which circulate, in a substantially vertical direction, currents of gas (or of air) at the desired temperature. In these tunnel furnaces, one or more longitudinal rows of motordriven fans disposed in the upper part and/or the lower part, or even in the sidewall, of the tunnel cause a circulation of gas which is transverse with respect to the direction of motion of the conveyor carrying the objects to be treated.

The gas, thus mixed, is brought to the desired temperature by heating devices and/or cooling devices distributed along the length of the tunnel. Most often, the heat treatment is a programmed heating or cooling requiring a hot gas obtained with burners or electrical resistances. As a general rule, the gas circulates upwards, and the furnace comprises successive zones in each of which the temperature is individually controllable. In certain of these tunnel furnaces, upper and lower fans alternate such that the flow of air is alternately upward and downward. Some of these furnaces are formed with contiguous chambers, each of which communicates with the neighboring one(s) via a hatch formed in the middle portion.

From the point of view of construction as such, the tunnel furnaces of the above kinds are in fact constituted by coaxial ducts. The central duct where the conveyor circulates is that in which the treated bodies pass through. From place to place, the central duct comprises orifices through which the flows of air are admitted and evacuated respectively. The median duct surrounds the central duct, forming an annular space which contains the circulation systems and the air duct systems, as well as the necessary heat exchangers. The outer duct surrounds the two former ones and forms a second annular space occupied by a thermal insulator. The outer duct and the thermal insulator can be the same thing when the thermal insulator is self-supporting (masonry, rammed earth, etc.)

In particular, an example of a tunnel furnace for the heat treatment of glass objects and formed with contiguous chambers is that described in U.S. Pat. No. 4,012,190. This tunnel furnace comprises an enclosure in which the heat treatment takes place. This enclosure is divided into successive zones, through which passes a lattice conveyor carrying the objects and successively passing them through each of the zones. In the upper part of each zone is mounted a fan intended to cause a more or less vertical circulation of gas in the enclosure of the tunnel furnace, and to collect this gas to then send it into a heating and/or cooling circuit.

The obvious disadvantage of a furnace of this type is that the temperature is not distributed in it in the desired manner. In fact, the axial exhausts create a convergent flow of gas having symmetry of revolution, such that the temperature is not steady in a vertical transverse plane, with the consequence that all the objects to be treated and located in the same transverse row perpendicular to the direction of travel do not undergo the same thermal treatment, according as they are in the middle or at the edges of the conveyor belt. In fact, the objects situated at the middle of the conveyor belt pass through vertically ascending currents of gas and thus undergo a uniform heat treatment. The objects situated at the sides of the conveyor, on the other hand, pass through currents of gas which ascend more obliquely the more they are distant from the center of the conveyor belt. The (oblique) currents of gas are caused by the suction of the fan situated at the center of the upper part of each zone of the tunnel furnace, and are more oblique the wider is the tunnel.

The objects situated at the sides of the conveyor consequently do not undergo a uniform heat treatment on the whole of their outer surface, since as they pass through obliquely ascending gas currents, their surfaces do not completely intersect the currents of gas. The result is a poor annealing treatment and consequently scrap losses which are not negligible.

The above disadvantages are not very notable while the width of the tunnel furnace remains relatively small, but since in recent years the tendency has been to construct furnaces of increasingly greater widths in order to increase the treatment capacity, the problem of the uniform transverse distribution of temperature has arisen with greater urgency, since the scrap caused by poor annealing has increased appreciably with the utilization of wider furnaces.

SUMMARY OF THE INVENTION

The object of the invention is to limit the exaggerated losses due to poor annealing, by subjecting the objects situated in the same transverse row to the same heat treatment and by causing them to follow the same cycle of temperature variation over the whole of their outer surface. Thus, in a furnace according to the invention, the temperature considered over a transverse section at a given point in the furnace is to be uniform so as to be the same at the like places of the treated bodies and in the different bodies passing through this point of the furnace. The objects situated in the same transverse row are thus to follow the same heat treatment cycle, whatever their position on the conveyor belt.

For the heat treatment to be uniform, it is also obviously necessary that the temperature observed over a longitudinal section follows a certain profile which, when followed by the bodies to be treated, ensures the desired cycle. Finally, other important criteria are the possibility of setting and regulating the temperature to any desired value at any point of the tunnel furnace, so as to suit the thermal cycle to the nature of the product to be treated, and also reliability of operation, durability of the plant, and economy of operation.

The invention furthermore has as its object a generally horizontal tunnel furnace for the heat treatment, by convection, of separate bodies of hollow glass, the furnace being of the type formed by the assembly of juxtaposed modular sections, the whole of this tunnel furnace comprising a heat treatment enclosure, a conveyor with a horizontal belt disposed in the lower zone of the enclosure and suitable to convey the said bodies, a system suitable for creating a transverse circulation of gas between the bodies to be treated, and a system for heating and/or cooling the gas, suitable for individually regulating the temperature to a desired value in each of the successive sections.

In the tunnel furnace according to the invention, each of the modular sections comprises:

- horizontal and mutually parallel openings occupying the width of the thermal enclosure and disposed beneath the conveyor and parallel to it, and each perpendicular to the direction of travel, suitable for each giving out one or more sheets of ascending gas;
- one or more collecting slots formed in the upper wall occupying the whole width of the thermal enclosure, disposed perpendicularly of the direction of travel, and suitable for collecting the said sheets of ascending gas;
- one or more temperature adjusting devices, suitable for bringing the collected gas to the temperature desired in the heat treatment enclosure of the modular section concerned; and
- a circulating fan, suitable for accepting the gas collected by the collecting slot(s) and returning the gas along a gas circulation path to the openings, after exposing the gas to the temperature adjusting device(s).

According to a particular embodiment, each modular section is provided with at least one closable orifice communicating with the exterior and suitable for bringing external air into the gas circulation circuit; this closable orifice is situated downstream of the collecting slots and upstream of the circulating fan.

The tunnel furnace is provided with a regulating device suitable for acting on the heating and/or cooling devices of each modular section to bring the collecting gas to, and maintain it at, the temperature desired in the heat treatment enclosure of the modular section concerned.

According to an advantageous embodiment, the blowers giving out the sheets of ascending gas are tubes which have one or more output openings at their upper part and which are fed at their ends by gas supply channels.

In the different embodiments above, the circulating fan is fed by a wind chest into which open the collecting slots which collect the gas.

According to a particular embodiment, each modular section is provided with two gas supply channels set up on either side of the section to feed the blowers with gas propelled by means of the circulating fan, the latter feeding the gas into the channels via a common transverse channel.

BRIEF DESCRIPTION OF THE DRAWINGS

In the attached drawings

FIG. 1 shows a longitudinal section along the line D—D of FIG. 2 of a convection furnace which is at present commercially available.

FIG. 2 is a sectional view along the line A—A of FIG. 1, in which the heating elements are shown.

FIG. 3 is a sectional view along the line B—B of FIG. 1, in which the heating and cooling elements are shown.

FIG. 4 is a sectional view along the line C—C of FIG. 1, in which only cooling elements are shown.

DETAILED DESCRIPTION OF THE SPECIFIC EMBODIMENT

Figure 5:
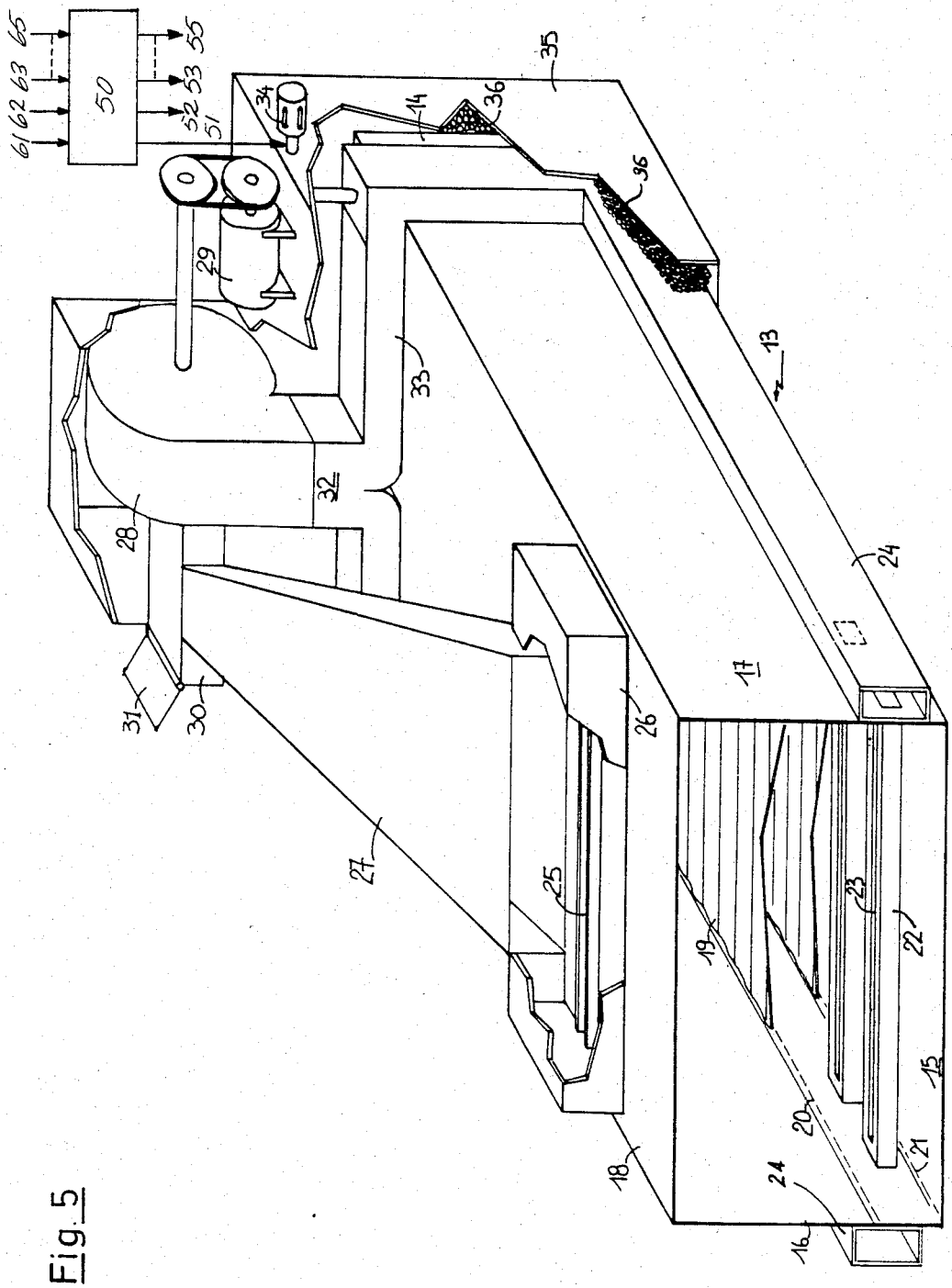
FIG. 5 is a perspective view (partially broken away) of a modular tunnel section indicated generally by 13, certain parts being broken away to show different details.
Figure 6:
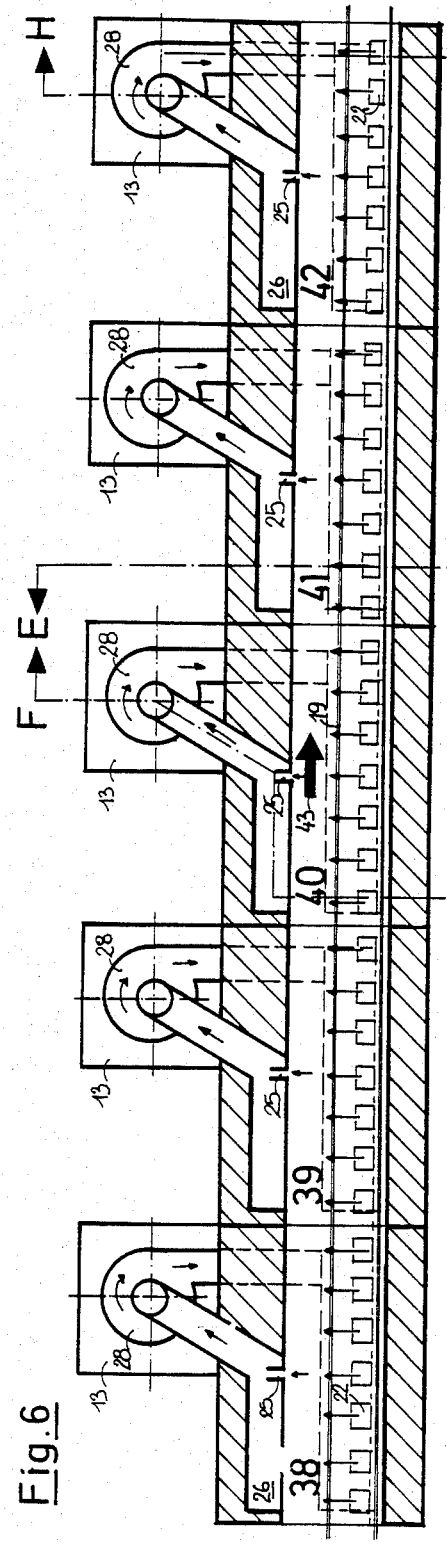
FIG. 6 shows, in a simplified manner, a tunnel furnace according to the invention and composed of five modular tunnel sections; it is a view in longitudinal section, along the line G—G of FIG. 9, of the furnace thus constituted.
Figure 7:
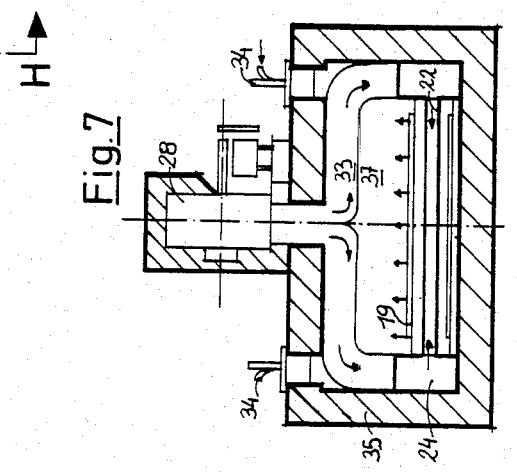
FIG. 7 is a view in section along the line H—H of FIG. 6, showing the burners 34.
Figure 8:
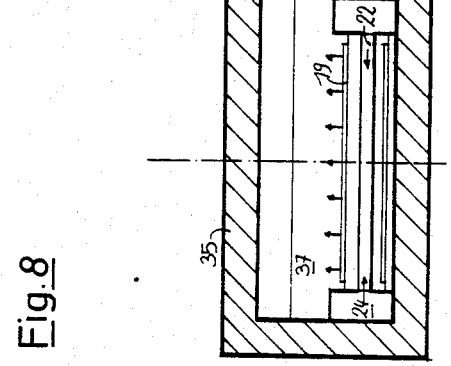
FIG. 8 is a view in section along the line E—E of FIG. 6, showing the continuous slot nozzles, or blowers, 22 which ensure the homogeneous distribution of the different streams of air.

To facilitate comparison, there is given below, with reference to the attached drawings, a description of a furnace which is at present on sale.

The tunnel furnace shown in FIGS. 1, 2, 3 and 4 comprises an enclosure 6 in which the heating and cooling take place. This enclosure is divided into five successive zones 1, 2, 3, 4 and 5. A belt 7, in the form of a lattice, moves in the lower part of the enclosure in the direction of the arrow 8. This belt brings the objects (not shown) to be heated or cooled successively through the zones 1-5. In the upper part of each of the zones is mounted a fan 9, such that it can cause in the enclosure 6 a circulation of rising gas as indicated by the arrows 10.

The fan 9 circulates the gases in a closed circuit according to the arrows 10. In the upper part and in the lateral channels there are mounted burners 11 intended to heat the objects. The gases leaving these burners are mixed and entrained by the recirculated air. The cooling element 12 injecting air aspirated by the fan 9 is shown in FIGS. 3 and 4.

The disadvantage evident in a furnace of this kind is that the temperature is not distributed in the furnace in a desirable manner. In fact, the axial suctions create a convergent air flow having symmetry of revolution, such that the temperature is not regular in a vertical transverse plane. Because of this imperfection, it is impossible to have the whole of the charge pass through the necessary thermal cycle.

A modular tunnel furnace according to the invention is specifically described below with reference to FIGS. 5-9.

The modular tunnel section 13 essentially comprises a chest 14 of rectangular parallelepipedal form, lying horizontally on its largest face 15 and laterally delimited by sides in the form of two small faces 16, 17 and above by an upper wall in the form of the upper large face 18. The remaining two small faces of the parallelepiped are open and constitute openings through which the modular tunnel sections 13 mutually communicate. A belt conveyor 19 runs in the lower part of the modular tunnel section 13; locally only the levels at which the upper and lower runs of the belt run are indicated by dotted lines at 20 and 21. The modular tunnel section 13 is equipped with a set of tubes 22 (also referred to herein as blowers), each of which is provided with an upper output slot or opening 23. The blowers 22 are mutually parallel and at the level 20 at which the belt 19 passes and perpendicular to the direction in which the belt runs. The blowers 22 open at the exterior of the small faces 16 and 17 into gas supply channels in the form of feed channels 24 disposed symmetrically on either side of the modular tunnel section 13 and on the latter. The upper large face 18 is pierced by a collecting slot 25 which is oriented as are the blowers 22 and collects the air or gas emitted by the latter. The collecting slot 25 is capped by a chamber in the form of a wind chest 26 which is itself connected, by a convergent conduit 27, to the entry port of a centrifugal fan 28 disposed above the modular tunnel section 13 and fixed to it by means which are not shown in detail. The centrifugal fan 28 is driven by a motor 29.

The entry port of the fan is likewise provided with an orifice 30 which can be closed by a shutter 31 to regulate or stop the admission of fresh air or gas. The exit 32 of the fan opens into a transverse channel 33 feeding the lateral channels 24. The transverse channel 33 is equipped with a temperature adjusting device in the form of burners, of which only the burner 34 is shown, which serve to reheat the air or gas blown out by the fan and brought by the feed channels 24 to the blowers 22. The transverse channel 33, the lateral feed channels 24 and the blowers 22 comprise the circulation system path. Therefore, the collecting slot 25, wind chest 26, conduit 27, fan 28 and the circulating path combine to create a gas circulating loop.

The whole assembly, with the exception of the fan, its entry port, and its motor, is protected by an external chest 35 of the same general shape as the modular tunnel section 13, and the intermediate space is occupied by a thermal insulator 36.

The tunnel furnace according to the invention (see FIGS. 6 and 7) consequently comprises a general heat treatment enclosure 37 in which the heating and/or cooling take place by convection. This general enclosure 37 is divided into five successive zones 38, 39, 40, 41 and 42, each of which is formed by a modular tunnel section. The lattice belt conveyor 19 runs in the lower part of the general enclosure 37 in the direction of the arrow 43. This belt moves the objects, such as hollow glass, to be heated or cooled (which are not shown) successively into the zones 38-42. It is thus apparent that in each of the zones a centrifugal fan 28 delivers the air or gas via the transverse channel 33 into the feed channels 24 into which the blowers 22 open. The streams of air uniformly emitted by the blowers 22 are taken up again in each zone by a collecting slot 25 and thus return in a closed circuit to the channels 24.

In the heating zones, the modular tunnel sections are equipped with burners 34 upstream of the channels 24, such that the combustion gases intimately mix with the air being circulated.

Figure 9:
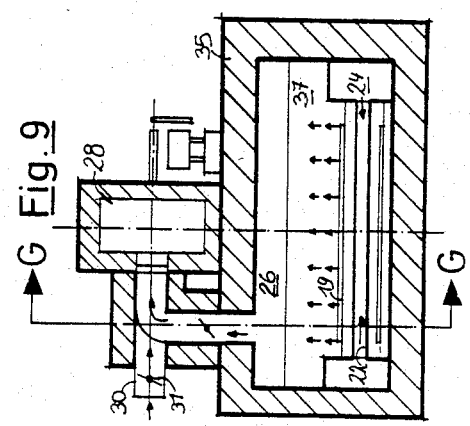
FIG. 9 is a view in section along the line F—F of FIG. 6, showing the fresh air suction device of the enclosure.

The apparatus according to the invention likewise permits the objects to be treated to be introduced into the general enclosure, to be cooled by dilution of the atmosphere of this general enclosure by means of a make-up gas, in particular, external air sucked in by means of the centrifugal fans 28 through their orifices 30, the amount of external air admitted being regulated by the position of the shutters 31 (FIGS. 5 and 9).

The burners 34 can obviously be replaced by other apparatuses, for example, electric resistances.

Coils situated in the circulation circuit for the gases, with a fluid circulating within them, can likewise be advantageously used. In fact, according to need, the fluid circulating in these coils can be hot or cold. Also the same device can act both for heating or for cooling of the gases circulating within the enclosure of modular section, according to the temperature desired for the heat treatment.

The apparatus of the invention is provided with a device for regulation 50 which enables the temperature curve to be chosen in a simple manner to obtain the desired heat treatment. The regulating device 50 acts individually on each of the modules 38-42 through the conductors 51-55, respectively. The regulating device 50 also accepts inputs, 61-65, from each of the modules 38-42, respectively, indicating the respective temperatures in the modules. The inputs 61-65 also allow the input of the desired temperatures for each module. The regulating device 50 is any regulator well known in the art for regulating a heating system. Thus, for each of the sections the regulating device acts on the heating system (feed to the burners, rheostats of the electrical resistances, or valves of the coils) when the temperature desired in the section concerned is high (annealing heating); on the other hand, when the temperature is relatively lower (cooling), the regulating device acts on the admission of external air (closable orifices 30 communicating with the exterior).

Besides this, the collecting slot 25 has the effect of gathering together the gas streams in the general form of a set of dihedra having a common edge, but of course it is likewise possible to embody a modular tunnel section 13 comprising several collecting slots 25 collecting the gas steams together into several dihedra. In the latter case, the gas streams are more nearly vertical.

The circulating fan 28 has been shown in the figures describing the apparatus of the invention with a horizontal axis. It goes without saying that the invention is not limited to this embodiment and that the tunnel furnace can be equipped with fans having vertical axes.

Certain details of embodiment which are not indispensable to the understanding of the principle of the invention have not been shown, for example, the feed channels 24 can shelter deflectors enabling the flow of air to be adjusted at will for each of the blowers 22. As a variant, each of the blowers 22 can be designed in the form of a U-shaped channel, open at its upper part, and provided with a cap with a single slot placed on the open part of the U. This system enables caps provided with slots of different widths to be used, likewise to influence the output of the various blowers.

What is claimed:

1. A generally horizontal tunnel furnace for heat treatment by convection of separate bodies of hollow glass, the furnace being formed by assembly of juxtaposed modular sections, each module having an exterior, an upper wall, and sides, the assembly forming a heat treatment enclosure having a width, the tunnel furnace comprising a conveyor with a horizontal belt disposed in the enclosure causing said bodies to travel in a direction through the tunnel furnace, a circulation system comprising a gas circulating loop for creating a circulation of gas, transverse to the movement of the belt and between the bodies to be treated, and a system for maintaining temperatures of the gas in each modular section such that gas temperatures in the modular sections are individually regulated to a desired value in each of the successive sections, each of said modular sections comprising:

gas discharging means comprising a plurality of horizontal and mutually parallel flues each defining an opening substantially occupying the width of the heat treatment enclosure beneath the conveyor, each flue being oriented in a direction perpendicular to the direction of travel of the conveyor, such that a sheet of ascending gas is produced from the opening;

gas collecting means comprising at least one horizontal collecting flue defining an opening formed in the upper wall substantially occupying the entire width of the heat treatment enclosure, the collecting flue being oriented in a direction perpendicular to the direction of travel of the conveyor, such that the collecting flue collects the sheets of ascending gas;

at least one temperature adjusting device for adjusting the temperature of the collected gas to the temperature desired in the heat treatment enclosure of the modular section; and a circulating fan for taking up the gas collected by the gas collecting means and for returning the gas along a gas circulating path to the gas discharging means after exposing the gas to the temperature adjusting device.

2. A tunnel furnace according to claim 1 wherein each modular section is provided with at least one regulating orifice situated downstream, in the gas circulating loop, from the gas collecting means and upstream, in the gas circulating loop, from the circulating fan and communicating with the exterior of the modular section allowing external air to be brought into the gas circulation path.

3. A tunnel furnace according to claim 1 wherein the tunnel furnace is provided with a regulating device for controlling the temperature adjusting device of each modular section.

4. Tunnel furnace according to claim 2 wherein the tunnel furnace is provided with a regulating device for controlling the temperature adjusting device of each modular section.

5. Tunnel furnace according to claim 1 wherein the gas discharging means comprises a plurality of tubes, each tube having an upper part and ends and comprising at least one outlet in the upper part forming one of said openings, the ends of the tubes being supplied by gas from the circulating path.

6. Tunnel furnace according to claim 2 wherein the gas discharging means comprises a plurality of tubes, each tube having an upper part and ends and comprising at least one outlet in the upper part forming one of said openings, the ends of the tubes being supplied by gas from the circulating path.

7. Tunnel furnace according to claim 3 wherein the gas discharging means comprises a plurality of tubes, each tube having an upper part and ends and comprising at least one outlet in the upper part forming one of said openings, the ends of the tubes being supplied by gas from the circulating path.

8. Tunnel furnace according to claim 4 wherein the gas discharging means comprises a plurality of tubes, each tube having an upper part and ends and comprising at least one outlet in the upper part forming one of said openings, the ends of the tubes being supplied by gas from the circulating path.

9. Tunnel furnace according to claim 5 comprising a chamber from which the circulating gas is supplied to the circulating fan and into which opens the gas collecting means.

10. Tunnel furnace according to claim 6 comprising a chamber from which the circulating gas is supplied to the circulating fan and into which opens the gas collecting means.

11. Tunnel furnace according to claim 7 comprising a chamber from which the circulating gas is supplied to the circulating fan and into which opens the gas collecting means.

12. Tunnel furnace according to claim 8 comprising a chamber from which the circulating gas is supplied to the circulating fan and into which opens the gas collecting means.

13. Tunnel furnace according to claim 5 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

14. Tunnel furnace according to claim 6 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

15. Tunnel furnace according to claim 7 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

16. Tunnel furnace according to claim 8 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

17. Tunnel furnace according to claim 9 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

18. Tunnel furnace according to claim 10 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

19. Tunnel furnace according to claim 11 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

20. Tunnel furnace according to claim 12 wherein a gas supply channel is located on either side of each modular section, and a transverse channel is located on each modular section for providing gas from the circulating fan to the gas supply channels, both said gas supply channels for each modular section being coupled for providing gas to each of said gas discharging means in such modular sections.

21. A modular section for use in a generally horizontal tunnel furnace for heat treatment by convection of separate bodies of hollow glass, the furnace being formed by assembly of juxtaposed modular sections, each module having an exterior, an upper wall, and sides, the assembly forming a heat treatment enclosure having a width, the tunnel furnace comprising a conveyor with a horizontal belt disposed in the enclosure causing said bodies to travel in a direction through the tunnel furnace, a circulation system comprising a gas circulating loop for creating a circulation of gas, transverse to the movement of the belt and between the bodies to be treated, and a system for maintaining temperatures of the gas in each modular section such that gas temperatures in the modular sections are individually regulated to a desired value in each of the successive sections, the modular section comprising:

gas discharging means comprising a plurality of horizontal and mutually parallel flues each defining an opening substantially occupying the width of the heat treatment enclosure beneath the conveyor, each flue being oriented in a direction perpendicular to the direction of travel of the conveyor, such that a sheet of ascending gas is produced from the opening;

gas collecting means comprising at least one horizontal collecting flue defining an opening formed in the upper wall substantially occupying the entire width of the heat treatment enclosure, the collecting flue being oriented in a direction perpendicular to the direction of travel of the conveyor, such that the collecting flue collects the sheets of ascending gas;

at least one temperature adjusting device for adjusting the temperature of the collected gas to the temperature desired in the heat treatment enclosure of the modular section; and a circulating fan for taking up the gas collected by the gas collecting means and for returning the gas along a gas circulating path to the gas discharging means after exposing the gas to the temperature adjusting device.

* * * * *